April 1, 1969     D. H. McKEOUGH     3,436,505
SLIDE VALVE FOR GAS BLAST BREAKERS Filed May 4, 1966

INVENTOR.
DANIEL H. McKEOUGH
BY
OSTROLENK, FABER, GERB & SOFFEN
ATTORNEYS

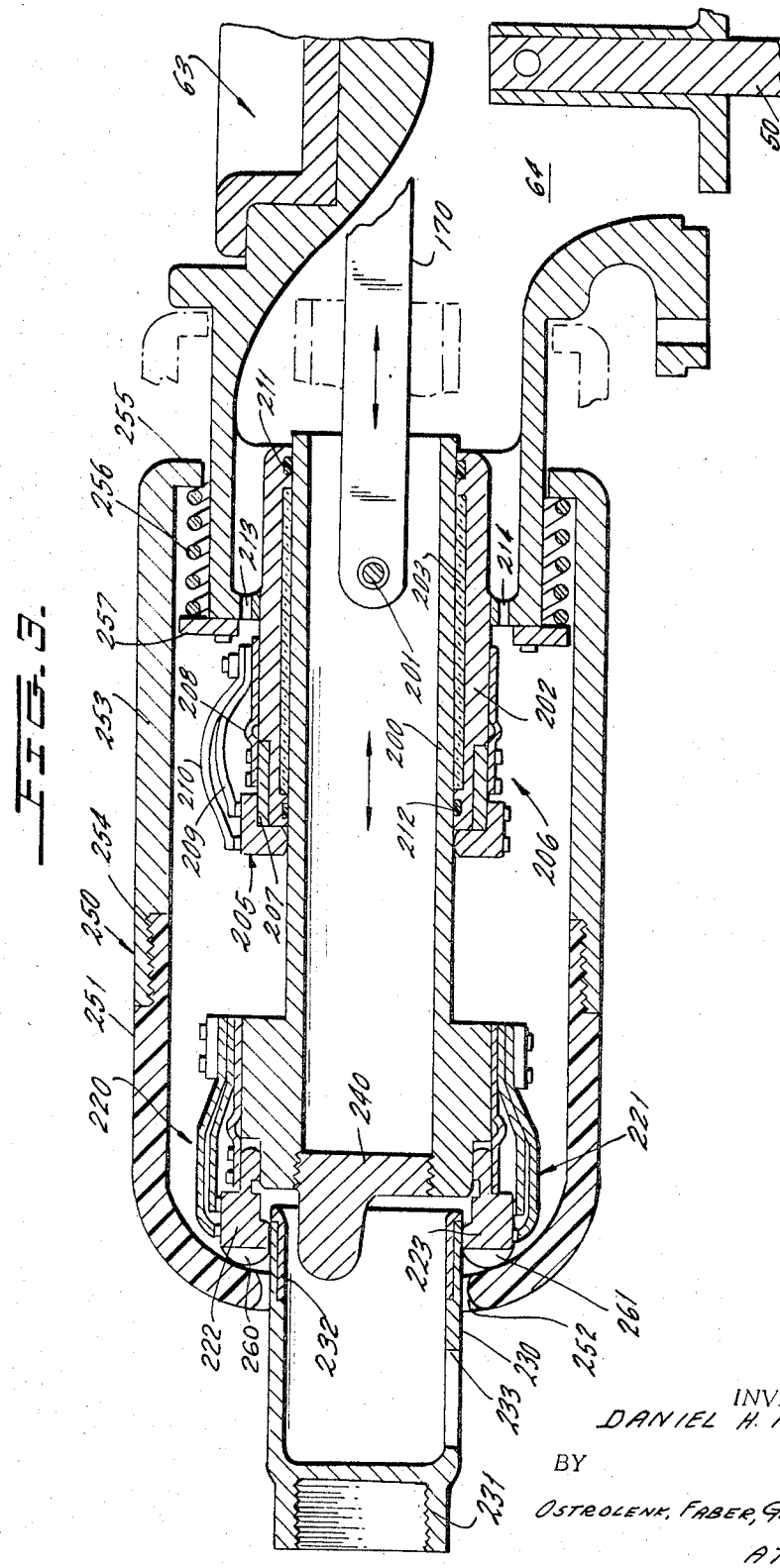

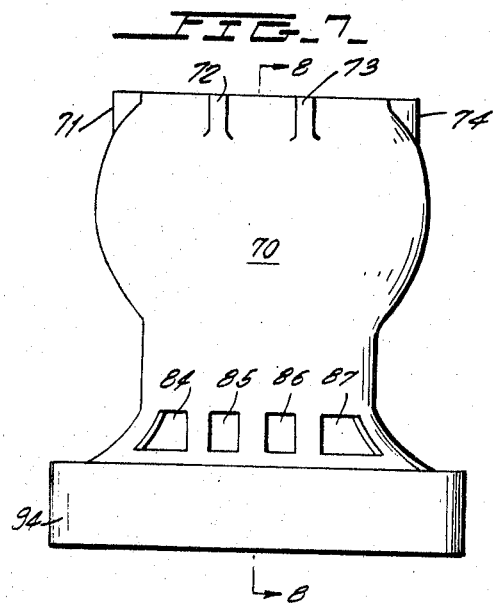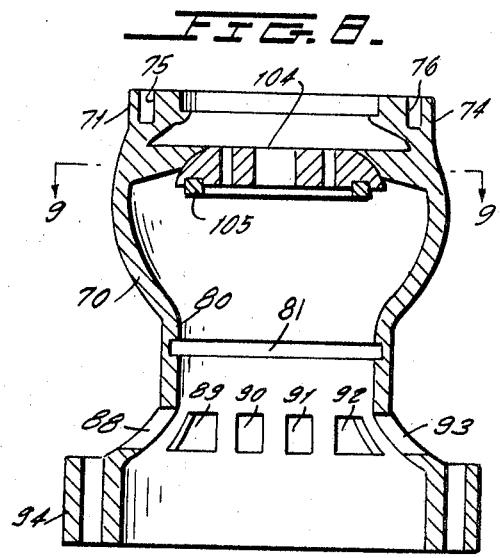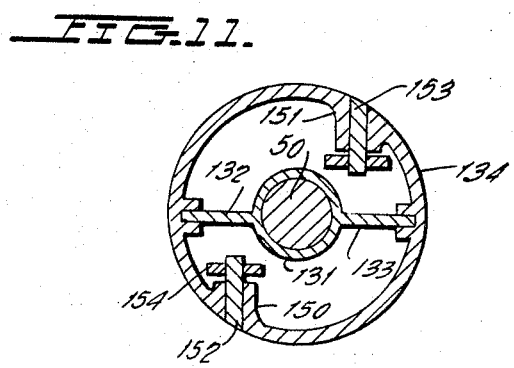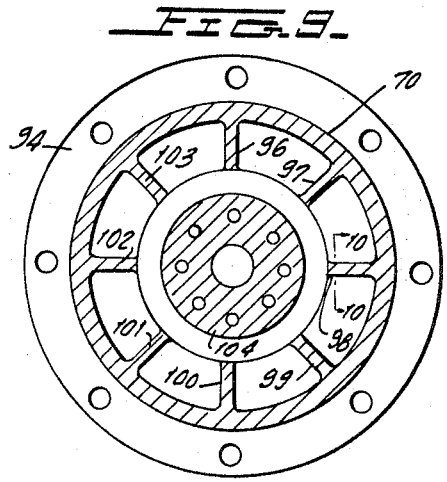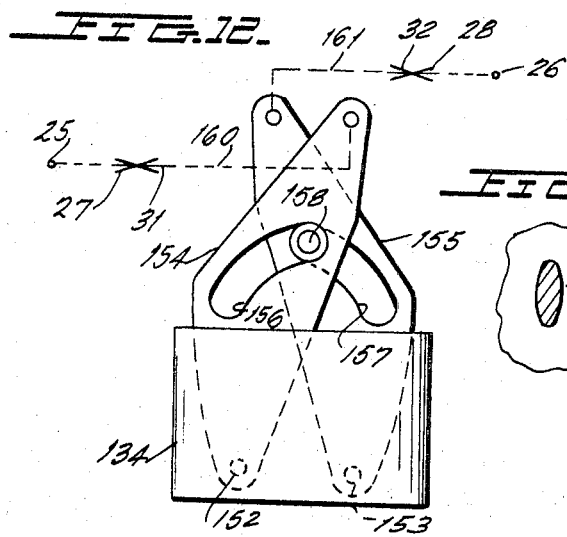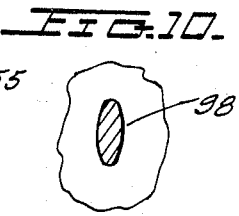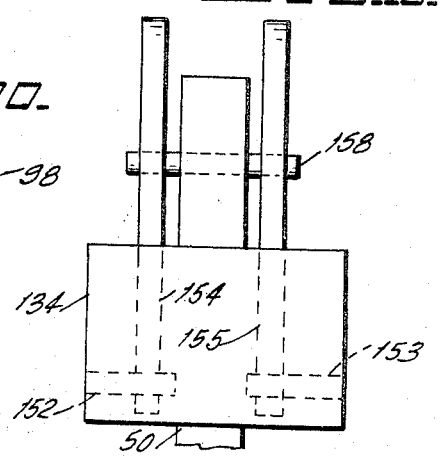

United States Patent Office 3,436,505
Patented Apr. 1, 1969

3,436,505
SLIDE VALVE FOR GAS BLAST BREAKERS
Daniel H. McKeough, Pasadena, Calif., assignor to I-T-E Circuit Breaker Company, Philadelphia, Pa., a corporation of Pennsylvania
Filed May 4, 1966, Ser. No. 547,621
Int. Cl. H01h 33/82, 33/80
U.S. Cl. 200—148       12 Claims

ABSTRACT OF THE DISCLOSURE

A high voltage high speed power circuit breaker having a sliding sleeve valve for the blast valve operated by an operating mechanism also connected to the movable contact of the circuit breaker. A movable baffle surrounds the movable contact and forms a gas blast channel. When the movable contact is opened, the baffle is moved to a retracted position.

---

This invention relates to high voltage circuit interrupter devices, and more particularly relates to a circuit interrupter having a novel sliding sleeve valve for controlling the application of gas to the cooperating contacts of the interrupter and to a movable orifice-defining body which surrounds the cooperating contacts.

In present applications of power circuit breakers, it is important to extinguish the arc drawn between separating contacts in less than three cycles, and in some applications, in less than two cycles. In the so-called "oiless" circuit breaker, it is common practice to achieve this relatively high speed, to store high pressure fluid, such as sulfur hexafluoride, relatively close to the arcing chamber. This high pressure gas is normally contained by a blast valve which, in the past, has been exposed to a relatively large force which must be overcome by an operating mechanism. Thus, where the operating forces are kept within reasonable bounds, there is an inherent time delay in the acceleration of the blast valve to an open position which adds to the interrupting time of the circuit breaker.

The large forces normally appearing across a typical blast valve is due to the differential pressure across the valve which separates the high pressure supply from the relatively low pressure surrounding the contacts. In accordance with one feature of the present invention, the blast valve is formed of a sliding sleeve valve in which substantially all of the differential force on the valve is perpendicular to its direction of motion and the differential force tending to oppose its axial motion is due to differential pressure acting over only the small area defined by the thin wall section of the sliding valve. Thus, the force required to move the valve and thereby to initiate or extinguish high pressure gas flow to the contacts is small, and reasonable operating forces move the valve with high acceleration.

As a further feature of the invention, the valve is opened both at contact opening and contact closing for brief intervals insuring adequate gas flow only at these critical times. Note that gas flow during contact closing is desirable to control "prestrike," or arcing which occurs as the cooperating contacts approach one another. The novel sleeve valve of the invention lends itself to this function by providing vents in the lower valve body which communicate between the high pressure gas and the interrupter chambers through the sleeve valve interior. The sleeve is then moved between an upper and lower sealing position which each close the path between the high pressure chamber and the low pressure chamber. However, while the sliding sleeve is in transit between its upper and lower sealing positions, high pressure gas can flow to the contacts through the sleeve interior and lower vents, thereby to deliver a gas blast when the contacts open or close, which lasts only for the transit time of the sliding sleeve valve.

As a further and important feature of the invention, the movable contacts are surrounded by a movable baffle, or circular gas-directing orifice which directs gas through the ionized region between the cooperating contacts. This baffle is, of course, of insulation material, typically one of the fluorine compounds such as Teflon. This baffle, however, is withdrawn from the stationary contact area after circuit interruption, thereby to remove the baffle from the electrical stresses in the contact area after the contacts are opened. This baffle is then returned to its gas-directing position just prior to reclosing of the contacts.

Accordingly, a primary object of this invention is to provide a novel valve arrangement for power circuit breakers which is economical and can be operated at high speed.

Another object of this invention is to form a novel high speed blast valve for gas blast circuit breakers which applies high pressure gas to a contact region only for a predetermined time during contact engagement and disengagement times.

A further object of this invention is to provide a novel gas blast valve structure which has a relatively small differential force thereacross due to a relatively large differential gas pressure across the valve.

Yet another object of this invention is to provide a novel baffle arrangement for directing high pressure gas in a power circuit breaker which is removed from an electrically stressed position when the contacts are open.

These and other objects of this invention will become apparent from the following description when taken in connection with the drawings, in which:

FIGURE 1 schematically illustrates a power circuit breaker incorporating the structure of the invention in a live-tank arrangement.

FIGURE 3 shows one of the contact assemblies operated by the mechanism of FIGURE 2, with the left end of FIGURE 3 connectable directly to the upper left end of FIGURE 2.

FIGURE 7 is a plan view of the valve housing of FIGURE 2.

FIGURE 8 is a cross-section view of FIGURE 7 taken across line 8—8 in FIGURE 7.

FIGURE 9 is a cross-section of FIGURE 8 taken across line 9—9 in FIGURE 8.

FIGURE 10 is a cross-section view of FIGURE 9 taken across line 10—10 in FIGURE 9.

FIGURE 11 is a cross-sectional view of the support sleeve of FIGURE 2 which carries a novel scissors-operating linkage for operating two separate contact assemblies.

FIGURE 12 is a front plan view of the subassembly of FIGURE 11, and schematically illustrates two identical contact assemblies.

FIGURE 13 is a side view of FIGURE 12.

Figure 1:
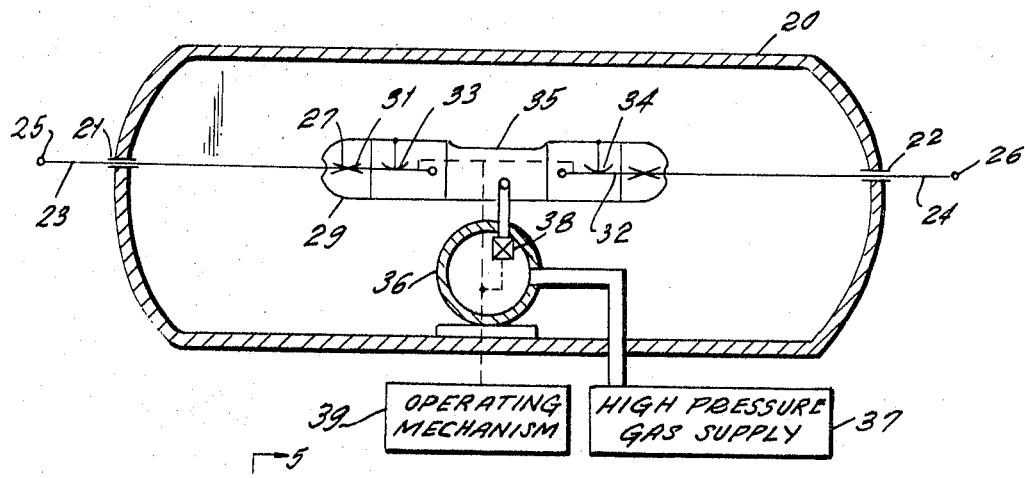

Referring first to FIGURE 1, there is schematically illustrated a live tank power circuit breaker which can incorporate the structure of the invention. The complete pole of the circuit breaker, of course, must include an insulating support column, and also insulating members to connect the operating mechanism and the high pressure supply from ground potential to the live tank assembly.

Clearly, however, the invention could be applied to grounded tank devices in which the high pressure chamber 36, is insulated from the tank. An insulating support column and connections are made to the operating mechanism, and high pressure gas supply through appropriate means of insulating materials. In the case of dead tank application, the device of the invention would be useful for interruption of circuits having voltages up to 230 kilovolts, and for live tank application for voltages up to 700 kilovolts.

The device of FIGURE 1 includes a main tank 20 at low pressure which receives two insulator bushings, schematically shown as bushings 21 and 22 which pass conductors 23 and 24, respectively, from terminals 25 and 26, respectively, to stationary contacts 27 and 28, respectively. Stationary contacts 27 and 28 are contained within identical interrupter chambers 29 and 30 respectively, which will later be described in detail with reference to FIGURE 3. Interrupter chambers 29 and 30 contain moving contacts 31 and 32, respectively, which are connected by sliding contacts 33 and 34, respectively, to a common conductive housing 35. The housing 35 and thus interrupter structures 29 and 30 are mounted on high pressure container 36, the interior of which is connected to a suitable supply 37 of any desired gas such as $SF_6$ which could be located externally of tank 20.

The interior of high pressure container 36 is then connected to the low pressure interior of interrupter chambers 29 and 30 by blast valve 38, which is later described in detail in FIGURE 2, whereby a blast of high dielectric fluid is passed between contacts 27–31 and 28–32 when these contacts close or open. In order to conserve the high pressure gas of tank 36, it is necessary to stop this gas flow as soon as the contacts have successfully opened or closed the circuit between terminals 25 and 26, as will be described.

An operating mechanism 39, schematically shown by dotted lines in FIGURE 1, is then connected to movable contacts 31 and 32, and to blast valve 38, whereby opening and closing of blast valve 38 is coordinated with the operation of the contacts 31 and 32.

Note that while the description of the invention presumes two identical series connected interrupter assemblies, or "breaks," portions of the invention are suitable for use with a single break or any desired number of breaks.

Figure 2:
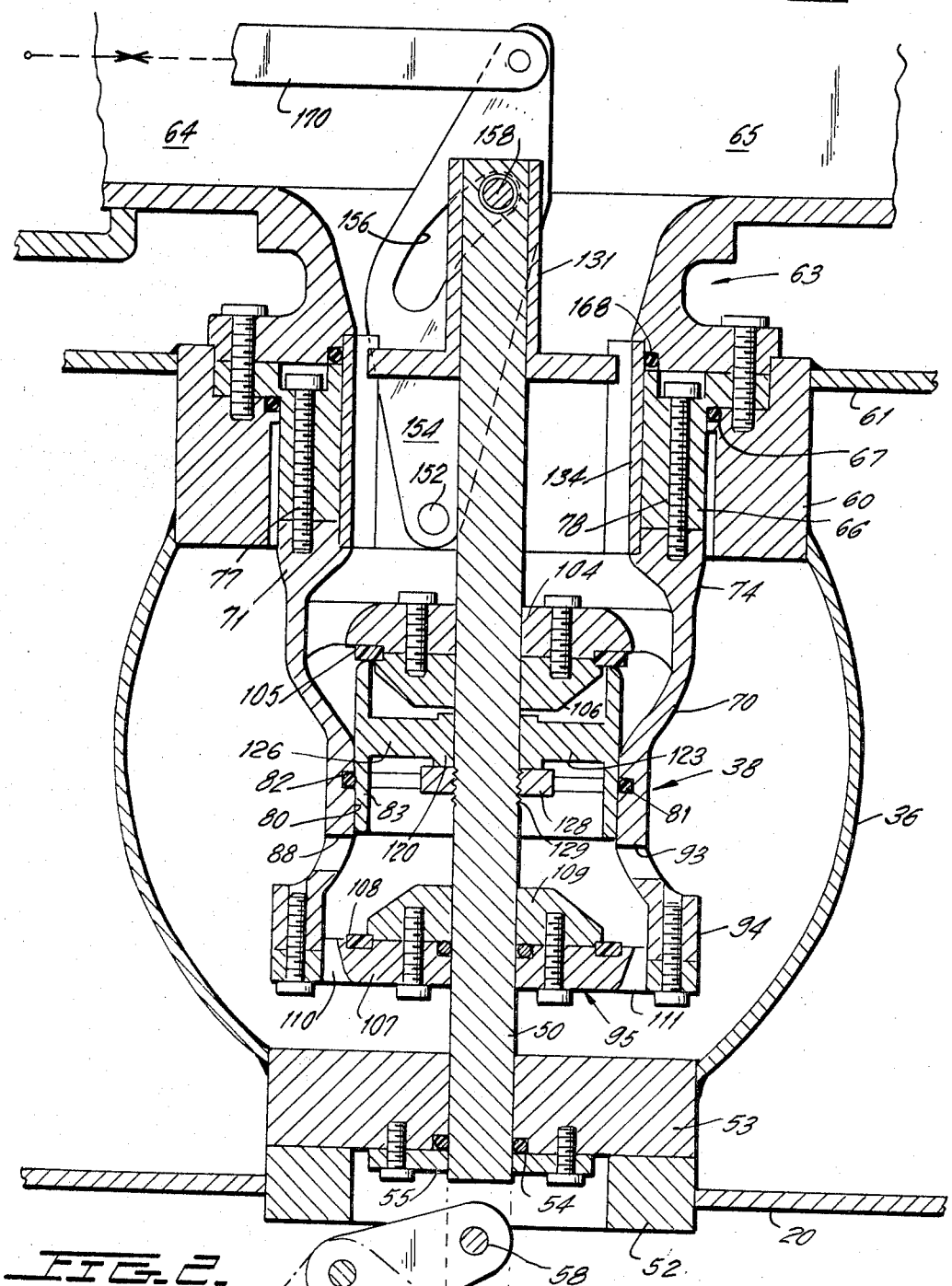
FIGURE 2 is a cross-section through the novel valve and operating mechanism of the invention as contained within the high pressure chamber.

Referring next to FIGURE 2, there is illustrated, in sectional view, the novel valve structure along with the high pressure chamber and portions of the operating mechanism referred to in FIGURE 1. Thus, high pressure tank 36 of FIGURE 2 carries the novel valve assembly 38 which is controlled by an operating mechanism including rod 50.

High pressure tank 36 is mounted on the bottom of low pressure tank 20 through the boss 52 welded in an opening of low pressure tank 20 and a boss 53 welded into an opening in the bottom of high pressure tank 36. A seal formed by gasket 54 held in position around rod 50 by plate 55 bolted to boss 53 prevents leakage from high pressure tank along rod 50.

Rod 50 is then moved between its uppermost position, shown in FIGURE 2, to a lower position, shown in dotted lines 50a by an operating crank 56 which is operated by any suitable mechanism. Crank 56 is pivoted on a fixed pivot 57 and is pivotally connected to the bifurcated end of rod 50 by pivot pin 58. The uppermost position of rod 50 corresponds to a contact engaged position for the circuit breaker contacts and its lower position of dotted lines 50a corresponds to the contact disengaged position for the contacts.

The top of high pressure tank 36 is then provided with an opening therein which has a boss 60 welded thereto. If desired, a support plate 61 suitably secured within low pressure tank 20 can be welded to boss 60, as shown, to provide additional support for high pressure tank 36. The conductive housing casting 63 having diametrically opposed outlets 64 and 65 of symmetric construction and leading to respective and identical interrupter structures are then bolted to boss 60. Note that a sleeve 66 is interposed between casting 63 and boss 60. Suitable sealing gaskets 67 and 68 are provided between members 60 and 63 to prevent leakage from high pressure tank 36.

Valve 38 of FIGURE 2 is composed of a cast housing section 70, best shown in FIGURES 7, 8, 9 and 10. Referring to these figures along with FIGURE 2, the valve body 70 is provided with upper extending ears around its periphery such as ears 71, 72, 73 and 74 (FIGURE 7) which have tapped openings therein, as shown by openings 75 and 76 in openings 71 and 74 in FIGURE 8. The valve body 38 is secured to sleeve 66 and thus boss 60 through suitable counter-sunk bolts, such as bolts 77 and 78 which pass through sleeve 60 and into the various ears 71 through 74 of body 70.

The central portion of body 70 is then tapered down into cylindrical section 80 having a groove 81 (FIGURE 8) which receives a seal 82 (FIGURE 2) which carries the highly polished outer surface of valve sleeve 83, as will be later described. The lower portion of body 70 contains suitable vents such as vents 84 through 93 which communicate between the high pressure chamber 36 and the interior of valve housing 70. The bottom of housing 70 has a flange 94 (FIGURE 9) which has tapped openings therethrough to permit the bolting of a bottom valve cap 95 thereto, as will be described later.

An upper central portion of body 70 has radial arms 96 through 103 extending inwardly from its interior which are welded to disk 104. Note that arms 96 through 103 are streamlined, as shown in FIGURE 10, to permit passage of fast moving high pressure gas therethrough. Disk 104 serves as a support for upper valve seal 105 which is clamped in position by clamp 106 (FIGURE 2) which is bolted to disk 104, as shown.

The lower cap 95 bolted to flange 94 is of construction similar to that of the upper disk 104 and includes a lower disk 107 which carries the lower seal 108 which is clamped to disk 107 by clamp 109 which is bolted to disk 107. Disk 107 is then provided with suitable openings such as openings 110 and 111 which permit flow of gas from high pressure tank 36 through the center of body 70 in parallel with gas flow through vents 84 through 93.

Figure 4:
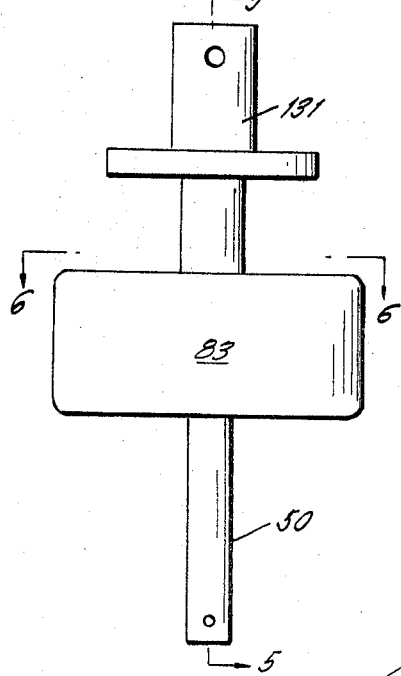
FIGURE 4 is a plan view of the operating rod of FIGURE 2 with the sleeve valve attached thereto.
Figure 5:
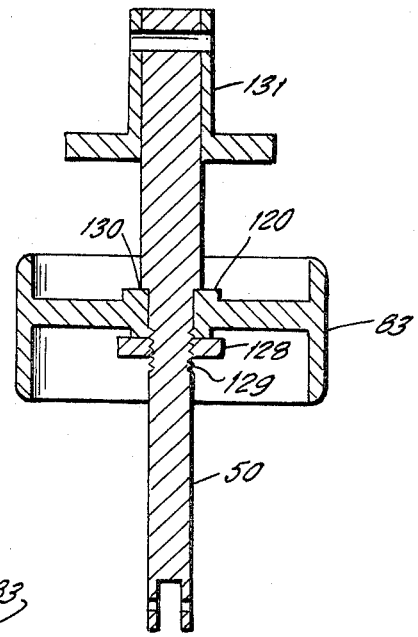
FIGURE 5 is a cross-section view of FIGURE 4 taken across line 5—5 in FIGURE 4.
Figure 6:
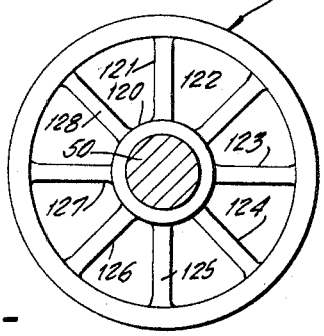
FIGURE 6 is a cross-section view of FIGURE 4 taken across line 6—6 in FIGURE 4.

Upper and lower seals 105 and 108, respectively, serve to seal the upper and lower rims of sleeve 83 when it is in its upper or lower position, respectively. The sleeve valve 83 and its support structure is shown in FIGURE 2 and in FIGURES 4, 5 and 6, respectively. Referring to these figures, the sleeve 83 is shown as attached to a central hub 120 (FIGURES 2, 5 and 6) by radiating spokes 121 through 127. Spokes 121 through 127 are preferably streamlined in section, as shown for the spokes of valve body 70 in FIGURE 10. Hub 120 is then connected to rod 50 by a jamming nut 128 threaded on threads 129 which jams the upper end of hub 120 against shoulder 130 of rod 50. Thus, sleeve 83 will move along with rod 50 as rod 50 is moved between its solid and dotted line positions of FIGURE 2.

The upper end of rod 50 is then rigidly connected to a guide sleeve having a hub 131 having extending arms 132 and 133 (FIGURE 11) which ride in keyways in sleeve 134 which is clamped between members 63 and 70. This prevents rotation of rod 50 as it moves up and down.

As previously mentioned, the outer surface of sleeve 80, which is of any suitable metal is highly polished. The sleeve 83 is then able to move without high frictional drag with respect to seal 82 of FIGURE 2 which tightly grips the outer diameter of sleeve 83 to prevent leakage of gas from chamber 36 upwardly through the valve body when sleeve 83 engages upper or lower seals 105 or 108, respectively.

From the foregoing, it is seen that movement of rod 50 will control the movement of the sleeve valve 83 between sealing engagement with seals 105 and 108, respectively. As will be later described, while sleeve 83 is in transit between these positions, gas can flow from high pressure tank 36 through vents 81–93 and vents 110 and 111, and through the center of sleeve 83 toward channels 64 and 65 leading to the interrupter chambers. In addition to this function, rod 50 controls the movement of the contacts of the interrupter structures so the gas blast action can be coordinated with the operation of the contacts.

In accordance with one feature of the invention, the rod 50 is connected to a novel "scissors" type linkage to permit simultaneous operation of two identical contact assemblies, as shown in FIGURE 2 and FIGURES 11, 12 and 13. Referring to these figures, the sleeve 134 is provided with two bosses 150 and 151 (FIGURE 11) which carry pivot pins 152 and 153, respectively. Pins 152 and 153 are then connected to cranks 154 and 155, respectively, (FIGURE 12), which carry cam slots 156 and 157, respectively. Cam slots 156 and 157 then receive suitable roller means extending from pin 58 (FIGURES 2, 12 and 13) fastened to the top of rod 50. The upper ends of cranks 154 and 155 are then connected to suitable output shafts, schematically illustrated by dotted lines 160 and 161 for cranks 154 and 155, respectively, which are connected to movable contacts 31 and 32 (FIGURES 1 and 12) which cooperate with stationary contacts 27 and 28, respectively. The novel scissors linkage operates such that when rod 50 moves down, pin 158 (or its equivalent rollers) ride down the cam slots 156 and 157 to rotate crank 154 clockwise and crank 155 counterclockwise. This motion is transmitted to linkages 160 and 161 to open the contacts connected thereto. The reverse operation occurs when rod 50 is moved up to reclose the contacts. A typical connecting link extending from cranks 154 and 155 is shown in FIGURES 2 and 3 for crank 154 as the link 170, which is pivotally connected to the top of crank 154.

FIGURE 3 illustrates a typical interrupter structure which could be driven by the mechanism of FIGURE 2 for the case of the left-hand unit (unit 29 of FIGURE 1). Clearly, a second and identical unit would be used for the right-hand interrupter which would also be mounted on the device of FIGURE 2. Referring now to FIGURE 3, its relation to FIGURE 2 can be established by noting the locations of rod 50, channel 64 in casting 63 and link 170. The left-hand end of link 170 is connected to hollow movable contact tube 200 by a pin 201 extending from link 170 to tube 200. Note that movable contact tube is equivalent to movable contact 31 of FIGURE 1.

Contact tube 200 is slidably mounted in a conductive sleeve 202 which is fastened to the left-hand end of channel 64 in casting 63. Preferably, an insulation sleeve 203 is interposed between tube 200 and sleeve 202 to prevent a sliding metal-to-metal connection between these members. Sliding electrical connection is completed between contact tube 200 and casting 63 (and thus the sliding contact tube of the other contact assembly, not shown) by spring biased finger contacts which surround tube 200. Two such contact fingers are shown in FIGURE 3 as contacts 205 and 206. Contact finger 205, which is typical, comprises a contact member 207 which is electrically connected to sleeve 202 by conductor 208. Springs 209 and 210 bearing on insulation buttons force contact 207 into engagement with tube 202. Gaskets 211 and 212 surround the interior ends of sleeve 202 to permit low friction movement thereof. Note that casting 63 has openings such as openings 213 and 214 therethrough (with the section being a spider section) to permit flow of gas from tank 36 externally of tube 200.

The left-hand end of movable contact tube 200 then carries a similar array of contact fingers such as contact fingers 220 and 221 which are of standard construction. Inwardly biased contacts 222 and 223 of fingers 220 and 221, respectively, are secured to tube 200 and overhang the left-hand end thereof. These contact fingers engage the end of hollow stationary contact tube 230 which terminates in a threaded opening 231 which is connectable to the end of the insulation bushing extending through the walls of the low pressure tank 20. A lining arcing material 232 coats the interior of tube 230 and is especially adapted to withstand arcing to the stationary contact tube 230. Note that tube 230 will have vents 233 communicating with the interior of low pressure tank 20. An arcing contact tip 240 is threaded into the end of tube 200 with arcs extending between arcing tip 240 and lining 232 when the contacts move between engagement and disengagement.

A baffle 250 is then provided to form an orifice about the cooperating contacts to direct gas from tank 36 between the contacts when they disengage. This baffle is formed of a first section 251 which is of suitable arc resistant material such as one of the fluoride compounds such as Teflon which has an opening 252 surrounding tube 230 adjacent the point of engagement by contact fingers 221 and 222. Section 251 is then threaded into engagement with conductive section 253 at thread 254 which has an inwardly turned end 255. End 255 telescopes over casting 63 and a compression spring 256 is captured between end 255 and a retaining plate 257 which is bolted to the end of casting 63. The baffle 250 is then held in position by the action of spring 256 and by projections such as projections 260 and 261 on contacts 222 and 223 which engage the left-hand inner surface of insulation section 251. Additional guide means could be used to position baffle 250 coaxially with tube 200.

The baffle 250 functions to lead high pressure gas through the annular region surrounding tube 200, and through the annular region between the encircling contact fingers such as fingers 220 and 221 and contact tube 230 and through the interior of tube 230 to discharge ports 233. During contact disengagement, movable tube 200 moves to the right, and an arc is drawn which is extinguished by the high pressure gas flowing through the arc. During this time, the high pressure gas holds baffle 250 in the position shown, against the biasing action of spring 256 since the internal area of the inwardly turned left-hand section of member 251 is greater than the internal area of section 255. However, after the arc is extinguished and the pressure on the interior and exterior of baffle 251 equalizes, spring 256 moves baffle 250 to the right and to the dotted line position until it reaches projections 260 and 261 which stop its motion. During reclosing, the high pressure gas on the interior of baffle 250 will cause baffle 250 to move ahead of tube 200 in the closing motion so that the baffle will be in a suitable gas deflecting position by the time there is a pre-strike of the closing contacts.

By virtue of this operation, insulation section is removed from the highly electrically stressed region between the open contacts while the breaker is standing in its open position. This is advantageous since it is generally undesirable to have solid insulating materials stressed continuously, particularly when they have been exposed to arc products and may have been contaminated during the interrupting process.

The operation of the entire system is as follows, assuming the circuit breaker is closed (as shown in the drawings) and is to be opened:

To open the breaker, crank 56 of FIGURE 2 is rotated clockwise by some suitable operating mechanism. This motion moves rod 50 downwardly, thus opening the blast valve and starting the motion of the movable contacts. First considering the operation of the blast valve 38, the downward movement of sleeve 83 breaks its seal at seal 105. Therefore, high pressure gas will flow from tank 36, through vents such as vents 88, 93, 107 and 111 (FIGURES 2, 7 and 8) through the interior of sleeve 83, through sleeve 134 and into channels 64 and 65 leading to the two interrupters. Note that the only force due to differential pressure across sleeve 83 is the small force related to the small area presented by the sleeve end. Therefore, high accelerations of the relatively low mass movable assembly is possible with reasonable forces applied to crank 56. Note that there are relatively low frictional forces on the sleeve due to its engagement by seal 82.

Gas flows through the valve will continue until the sleeve 83 seats on seal 108 to cut off further gas flow to channels 64 and 65. However, by this time, the contacts have completely separated and arcing is extinguished.

While the valve 83 is open, the rod 50 causes crank 154 and 155 to rotate, thereby to withdraw their respective movable contacts from the engaged position. Thus, in FIGURES 2 and 3, crank 154 rotates clockwise to move link 170 and contact tube 200 to the right. However, gas pressure, released by the blast valve 38 has filled baffle 250 with high pressure gas before contact fingers 220 and 221 leave stationary contact 230. Therefore, when these contacts separate, they do so in a high pressure environment followed by an immediate blast through the arcing space. Note that the early build-up of pressure within baffle 250 will keep the baffle in its desired position shown against the force of spring 256.

Once the sleeve 86 engages seal 108, gas flow is cut off and the movable contact tube is in its fully withdrawn position. The pressure within baffle 250 will finally equalize to the external pressure so that baffle 250 will be withdrawn to a retracted position by spring 256 where it is removed from the high stresses at the stationary contact 230.

In order to close the circuit breaker, crank 56 of FIGURE 2 is rotated counterclockwise to move sleeve valve 83 up and away from seal 108. This causes contact tube 200 to move toward its engaged position, and opens the blast valve 38. The application of gas pressure to baffle 250 then causes it to move to the left in advance of contact tube 200 so that baffle 250 is in position before the contacts reach pre-strike position. Once the contacts are sufficiently close, they begin to arc (prestrike), but in the presence of the high pressure dielectric gas blast defined by baffle 250 and opened blast valve 38. Once the contacts seat, sleeve 83 reaches seal 105 to extinguish the gas flow, with baffle 250 held in position by projections 260 and 261, until the breaker is to be opened again.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A valve structure for controlling the flow of gas from a high pressure region to a low pressure region; said valve structure comprising a generally cylindrical housing having a centrally restricted section of constant internal diameter and top and bottom sections having internal diameters greater than said diameter of said centrally restricted section, a hollow elongated sleeve movable along the axis of said generally cylindrical housing; said hollow sleeve received in gas sealed relation by said constant internal diameter section; a first and second sealing ring conforming to the shape of the top and bottom end, respectively, of said hollow elongated sleeve; said first sealing ring fixed in said top section of said housing and aligned to receive the upper end of said hollow elongated sleeve; said first sealing ring fixed in said top section of said housing and aligned to receive the upper end of said hollow sleeve and to seal across the top of said sleeve when said sleeve is moved upwardly; said second sealing ring fixed in said bottom section of said housing and aligned to receive the bottom end of said hollow sleeve when said sleeve is moved downwardly; said first and second sealing rings lying in parallel planes spaced from one another by a distance greater than the length of said sleeve; and first channel means connecting said low pressure region to the interior of said top section externally of the periphery of said first sealing ring; and second channel means connecting said high pressure region to the interior of said bottom section externally of the periphery of said second sealing ring.

2. The device as set forth in claim 1 which includes an operating rod connected to said sleeve and operable to move said sleeve along its axis and between sealing engagement with respect to said first and second sealing rings.

3. The device as set forth in claim 2 wherein said sleeve has radially inwardly extending arms connected to a hub; said operating rod connected to said hub.

4. The device as set forth in claim 3 wherein said first and second sealing rings are connected to said housing by respective radially outwardly extending arms defining gas passages exteriorly of the periphery of said first and second sealing rings.

5. A power circuit breaker comprising a pair of cooperable contacts contained in a low pressure region, a high pressure region, and a valve for controlling the flow of gas from said high pressure region into said low pressure region to extinguish arcs drawn between said pair of cooperable contacts; said valve comprising a generally cylindrical housing having a centrally restricted section of constant internal diameter and top and bottom sections having internal diameters greater than said diameter of said centrally restricted section; a hollow elongated sleeve movable along the axis of said generally cylindrical housing; said hollow sleeve received in gas sealed relation by said constant internal diameter section; a first and second sealing ring conforming to the shape of the top and bottom end, respectively, of said hollow elongated sleeve; said first sealing ring fixed in said top section of said housing and aligned to receive the upper end of said hollow sleeve and to seal across the top of said sleeve when said sleeve is moved upwardly; said second sealing ring fixed in said bottom section of said housing and aligned to receive the bottom end of said hollow sleeve when said sleeve is moved downwardly; said first and second sealing rings lying in parallel planes spaced from one another by a distance greater than the length of said sleeve; and first channel means connecting said low pressure region to the interior of said top section externally of the periphery of said first sealing ring; and second channel means connecting said high pressure region to the interior of said bottom section externally of the periphery of said second sealing ring.

6. The device as set forth in claim 5 which includes an operating rod connected to said sleeve and operable to move said sleeve along its axis and between sealing engagement with respect to said first and second sealing ring; said operating rod further connected to said cooperable contacts; the maximum motion of said cooperable contacts by said operating rod corresponding to full movement of said sleeve from said first sealing ring to said second sealing ring whereby high pressure gas is applied to said low pressure region when said cooperable contacts are in intermediate positions other than their final end positions.

7. The device as set forth in claim 6 wherein said sleeve has radially inwardly extending arms connected to a hub; said operating rod connected to said hub; said first and second sealing rings connected to said housing by respective outwardly radially extending arms defining gas passages exteriorly of the periphery of said first and second rings.

8. The device as set forth in claim 5 wherein one of said cooperable contacts has a baffle connected thereto to define a portion of said low pressure region; said baffle comprising an elongated cylinder having an orifice at one end thereof; said orifice enclosing the other of said cooperable contacts when said cooperable contacts are engaged to define a path for high pressure gas admitted to the interior of said baffle through said cooperable contacts.

9. The device as set forth in claim 8 wherein said baffle is connected to said one of said cooperable contacts by a resilient biasing means biasing said baffle away from said other of said cooperable contacts; high pressure gas in said baffle holding said orifice over said one of said cooperable contacts against the force of said resilient biasing means.

10. A baffle for a circuit interrupter; said circuit interrupter having a pair of cooperable contacts movable between an engaged and disengaged position, a source of high pressure gas, and valve means for admitting said high pressure gas into said baffle when said pair of cooperable contacts are moving between their said engaged and disengaged positions and for preventing flow of gas when said cooperable contacts are in their said engaged and disengaged positions; said baffle comprising an elongated hollow cylinder having an inwardly formed portion defining an orifice at one end thereof; said baffle mounted concentrically with one of said cooperable contacts; said one of said cooperable contacts being movable along the axis of said baffle; said orifice enclosing the other of said cooperable contacts when said cooperable contacts are engaged to define a path for high pressure gas admitted to the interior of said baffle through said cooperable contacts; and a common support structure for slidably supporting both said one of said cooperable contacts and said baffle; a resilient biasing means connected between said baffle and said support structure for biasing said baffle away from said other of said cooperable contacts; high pressure gas in said baffle holding said orifice axially withdrawn from said other of said cooperable contacts against the force of said resilient biasing means, said baffle disposed completely external of said common support structure, and said pair of cooperable contacts.

11. The device as set forth in claim 10 which includes a common operating rod connected to said valve means and to at least one of said cooperable contacts for opening said valve means only when said cooperable contacts are being moved to a new engagement position.

12. The device as set forth in claim 6 which includes a second pair of cooperable contacts identical to said pair of cooperable contacts; and scissors connection means for connecting said operating rod to both of said pairs of cooperable contacts; said scissors connection means including first and second counter rotating crank arms having respective first fixed pivots and respective arcuate cam slots directed oppositely of one another; said operating rod having a pin extending therefrom and into each of said arcuate cam slots whereby axial movement of said operating rod causes counter rotary movement of each of said crank arms; one end of each of said crank arms connected to a respective cooperating contact of said pairs of cooperable contacts.

References Cited

UNITED STATES PATENTS

| | | | |
|---|---|---|---|
| 1,251,730 | 1/1918 | Younie et al. | 137—625.26 X |
| 2,016,997 | 10/1935 | Hartke | 137—614.13 X |
| 2,932,316 | 4/1960 | Stanton | 137—508 |
| 3,042,061 | 7/1962 | Dobrikin | 137—508 |
| 3,095,903 | 7/1963 | Jennings | 137—625.68 |
| 3,214,545 | 10/1965 | Cromer. | |

FOREIGN PATENTS 1,142,938    1/1963    Germany.

ROBERT S. MACON, Primary Examiner.

U.S. Cl. X.R.

137—508, 625.26, 625.49; 200—148